United States Patent
Funk et al.

(10) Patent No.: US 10,018,485 B2
(45) Date of Patent: Jul. 10, 2018

(54) SCALE AND POSITION-MEASURING DEVICE HAVING SUCH A SCALE

(71) Applicant: DR. JOHANNES HEIDENHAIN GmbH, Traunreut (DE)

(72) Inventors: Stefan Funk, Traunstein (DE); Peter Speckbacher, Kirchweidach (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 15/415,913

(22) Filed: Jan. 26, 2017

(65) Prior Publication Data
US 2017/0211951 A1   Jul. 27, 2017

(30) Foreign Application Priority Data

Jan. 26, 2016 (DE) .................. 10 2016 201 068

(51) Int. Cl.
| | | |
|---|---|---|
| *G01B 11/14* | (2006.01) | |
| *G01D 5/26* | (2006.01) | |
| *G01D 5/30* | (2006.01) | |
| *G01D 5/38* | (2006.01) | |
| *G02B 5/18* | (2006.01) | |

(52) U.S. Cl.
CPC ............. *G01D 5/264* (2013.01); *G01D 5/266* (2013.01); *G01D 5/30* (2013.01); *G01D 5/38* (2013.01); *G02B 5/1861* (2013.01)

(58) Field of Classification Search
CPC .......... G01D 5/264; G01D 5/266; G01D 5/30; G01D 5/38; G02B 5/1861
See application file for complete search history.

(56) References Cited

U.S. PATENT DOCUMENTS

| | | |
|---|---|---|
| 4,708,437 A | 11/1987 | Kraus |
| 2004/0090677 A1 | 5/2004 | Allgauer et al. |
| 2005/0052743 A1* | 3/2005 | Speckbacher ........ G02B 5/1861 359/566 |

FOREIGN PATENT DOCUMENTS

| | | |
|---|---|---|
| DE | 3518774 A1 | 11/1986 |
| DE | 10236788 A1 | 3/2004 |
| EP | 0160784 A2 | 11/1985 |
| EP | 0773458 A1 | 5/1997 |

* cited by examiner

*Primary Examiner* — Michael P Stafira
(74) *Attorney, Agent, or Firm* — Leydig, Voit & Mayer, Ltd.

(57) ABSTRACT

A scale for an optically scanning position-measuring device includes a carrier and a reflective layer disposed on the carrier. A transparent spacer layer is disposed on the reflective layer. The spacer layer has a patterned, partially transparent layer thereon which defines a bright/dark pattern in which regions having the partially transparent layer appear dark and regions without the partially transparent layer appear bright. A sealing layer is disposed on the patterned, partially transparent layer. Products of refractive index and layer thickness are the same for the spacer layer and the sealing layer, or differ by an odd multiple.

10 Claims, 1 Drawing Sheet

SCALE AND POSITION-MEASURING DEVICE HAVING SUCH A SCALE

CROSS-REFERENCE TO PRIOR APPLICATION

Priority is claimed to German Patent Application No. DE 10 2016 201 068.9, filed on Jan. 26, 2016, the entire disclosure of which is hereby incorporated by reference herein.

FIELD

The present invention relates to a scale for an optical position-measuring device and to a position-measuring device having such a scale. In a position-measuring device, such scales are scanned by a scanning head using light in order to sense a displacement between the scale and the scanning head.

BACKGROUND

German patent application DE 92 16 10236788 A1 describes a scale in the form of an amplitude grating. This amplitude grating includes a substrate having a reflective layer thereon. This reflective layer is followed by a transparent spacer layer which, in turn, has a partially transparent layer deposited thereon. This partially transparent layer is patterned by partial removal. Light incident on this partially transparent layer is partially reflected and partially transmitted. The reflected light is extinguished by destructive interference with the transmitted light that is reflected back from the lower reflective layer, so that the scale appears dark here, while in regions where the partially transparent layer is absent, the scale appears bright.

To this end, (under the simplifying assumption of a phase jump of exactly $\pi$ at the interfaces air/partially transparent layer, air/spacer layer, as well as spacer layer/reflective layer, and negligible absorption), the transparent spacer layer must cause a phase jump of $\pi$; i.e., (given perpendicular incidence of light) must have a thickness which, multiplied by the refractive index of the spacer layer, is equal to one-fourth of the wavelength of the light used for scanning. However, in the bright regions, the inventors have recognized that a certain portion of light is also reflected at the interface between the air and the spacer layer, so that this reflected light also interferes destructively with the light that is reflected at the reflective layer. As a result, the bright regions appear less bright and the bright/dark contrast of the amplitude grating is reduced. In addition, the partially transparent layer is made of a very thin (a few nanometers) metal layer, which is exposed to both chemical and mechanical influences. Therefore, the inventors have recognized that, under certain circumstances, it may be damaged or its optical properties may change.

SUMMARY

In an embodiment, the present invention provides a scale for an optically scanning position-measuring device including a carrier and a reflective layer disposed on the carrier. A transparent spacer layer is disposed on the reflective layer. The spacer layer has a patterned, partially transparent layer thereon which defines a bright/dark pattern in which regions having the partially transparent layer appear dark and regions without the partially transparent layer appear bright. A sealing layer is disposed on the patterned, partially transparent layer. Products of refractive index and layer thickness are the same for the spacer layer and the sealing layer, or differ by an odd multiple.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a scale for a position-measuring device which is improved with respect to the optical properties and the stability to environmental influences.

According to an embodiment, a scale for an optically scanning position-measuring device includes a carrier on which is disposed a reflective layer, followed by a transparent spacer layer having a partially transparent layer thereon which is patterned, for example, into a grating. The partially transparent layer defines a bright/dark pattern where regions having the partially transparent layer appear dark and regions without the partially transparent layer appear bright. A sealing layer is disposed on the patterned, partially transparent layer. In this context, it applies that the optical wavelengths (i.e., the products of the refractive index and the layer thickness) are approximately the same for the spacer layer and the sealing layer, or differ by an odd multiple.

In a particularly preferred embodiment, both the spacer layer and the sealing layer are made of the same material, namely silicon dioxide. Therefore, the two layers have the same refractive index. Both layers may be deposited with the same layer thickness.

In the position-measuring device according to an embodiment of the present invention, such a scale is scanned by a scanning head using monochromatic light. A light beam emitted by the scanning head and reflected at the reflective layer in the bright region of the scale experiences a phase shift of $2\pi$ or an integer multiple thereof as it passes twice through the spacer layer and the sealing layer, compared to a light beam immediately reflected at an interface of the sealing layer. Therefore, unlike in the prior art, these light beams do not interfere destructively, the brightness of the bright region is not reduced, the bright/dark contrast is greater, and the analysis of the signals in the scanning head is easier and more accurate.

Due to the additional sealing layer, the scale is less sensitive to environmental influences and production-related variations in the thickness of the partially transparent layer.

Figure 1:
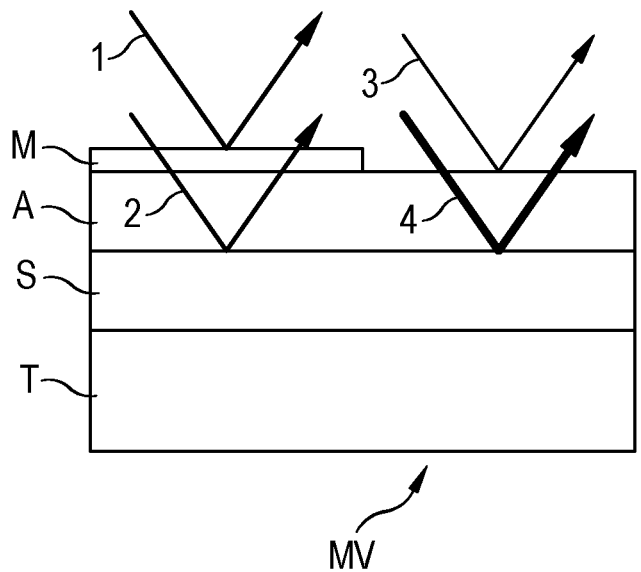
FIG. 1 shows a scale according to the prior art.

FIG. 1 shows the prior art mentioned at the outset. Scale MV is built up on a carrier T which is made, for example, of a material having a particularly low thermal expansion coefficient, such as a glass-ceramic available under the trade name Zerodur. Other materials, such as quartz glass, float glass or steel are also suitable for carrier T. Carrier T has deposited thereon a reflective layer S, which may be, for example, a vapor-deposited aluminum layer or also a gold layer. This is followed by spacer layer A, which may be an SiO2 layer having a refractive index of n=1.48. In the dark regions of scale MV, which is in the form of an amplitude grating, a partially transparent layer M follows, which may take the form of a chromium layer having a thickness of a few nanometers. Silicon would also be a suitable material for a partially transparent layer. During the manufacture of scale MV, this partially transparent layer M is initially deposited over the entire surface and subsequently removed in the bright regions. Suitable processes for this purpose are lithography processes, followed by an etching step.

The formation of the bright/dark pattern of this scale MV will be explained with the aid of the schematically drawn light beams 1-4. In the dark region of scale MV, shown on the left of FIG. 1, light is reflected both at partially transparent layer M and at reflective layer S. This is schematically illustrated by the two light beams 1 and 2. The materials and layer thicknesses are selected such that the amplitudes of the two reflected beams 1 and 2 exiting scale MV are ideally equal, and that the two beams 1 and 2 ideally have a phase offset of $\pi$. Then, destructive interference between the two beams 1 and 2 causes them to cancel one another, thereby producing a dark region of scale MV. Amplitude equality is achieved by means of the layer thickness and the refractive index of the partially transparent layer. The phase offset of it is substantially obtained by suitably selecting the thickness of spacer layer A, which should be approximately equal to one-fourth of the wavelength used for scanning scale MV, divided by the refractive index of spacer layer A. Again, this is based on the simplifying assumption that a phase jump of exactly $\pi$ occurs at the interfaces air/partially transparent layer, air/spacer layer, as well as spacer layer/reflective layer, and that the absorption is negligible. Since destructive interference occurs also for odd multiples of $\pi$, it is also possible to use spacer layers A of correspondingly greater thickness.

In the bright region of scale MV, shown on the right of FIG. 1, the major portion of the light is reflected at reflective layer S, which is schematically indicated by light beam 4. Only a small portion, schematically indicated by light beam 3, is immediately reflected at spacer layer A. Overall, therefore, this region will appear bright.

A layered structure of this type has the disadvantage that in order to produce a metallic layer M that is partially transparent in the optical range, the film thickness of this layer can be no more than a few nanometers and should be met as closely as possible to obtain high contrast. At the same time, the imaginary part of the refractive index of the selected metal should not be too high in order to minimize the absorption of partially transparent layer M.

Chromium is, in principle, well suited for this purpose because of its low refractive index, but forms transparent oxides $Cr_xO_y$. This means that the actual thickness of partially transparent layer M may change because of chemical reactions during manufacturing and cleaning processes or because of other environmental influences. However, this also causes a change in the bright/dark contrast because the film thickness no longer exhibits the optimal partial transparency. The substantially complete extinction of light beams 1 and 2 is then no longer guaranteed and the dark region appears slightly brighter.

An additional problem is that in the bright region, the reflection of light beam 3 at the interface with spacer layer A interferes destructively with the reflection of light beam 4 at reflective layer S. Although, due to the greatly differing amplitudes, light beams 3 and 4 cancel one another to an extent far less than complete extinction, the bright/dark contrast of scale MV is nevertheless reduced.

Figure 2:
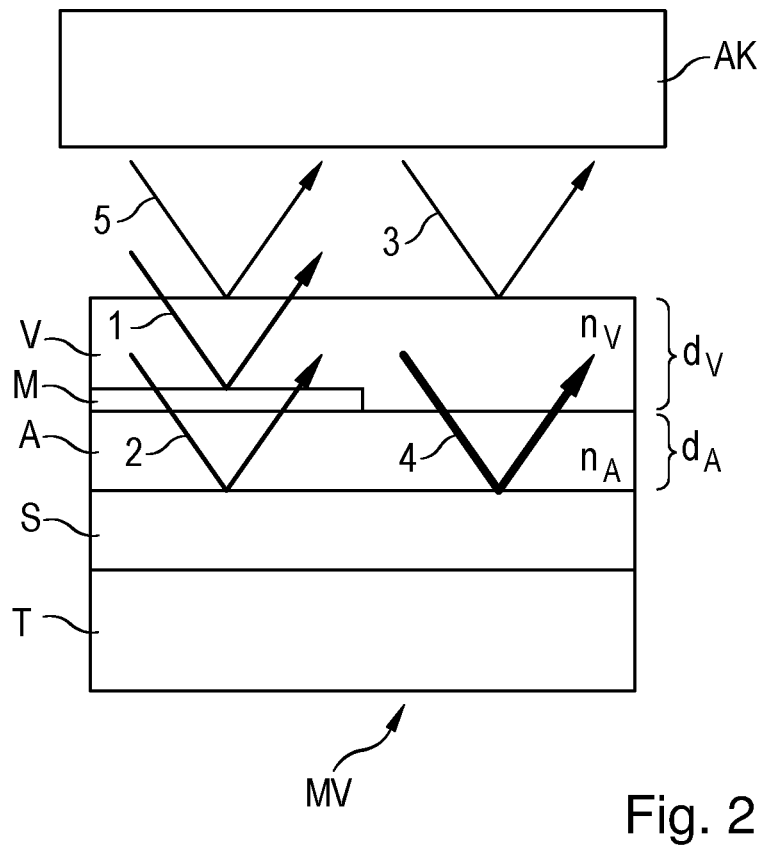
FIG. 2 shows a scale according to an embodiment of the present invention.

The improvement of scale MV, illustrated in FIG. 2, makes it possible to solve the described problems of both the dark and bright regions, and thus provide a more stable scale MV that is optimized with respect to the bright/dark contrast.

FIG. 2 further schematically shows a scanning head AK, which emits and receives light for scanning scale MV. Photodetectors in scanning head AK produce electrical signals from which position values may be derived in known manner.

An improvement consists in an additional sealing layer V which, on the one hand, protects partially transparent layer M and, given a suitable optical design, also provides increased brightness in the bright regions, and thereby overall provides an improved bright/dark contrast.

Sealing layer V may be made of the same material as spacer layer A; i.e., for example, of sputtered $SiO_2$, but also of other materials, such as wet-chemically deposited chemicals, such as spin-on-glass or photoresists (e.g., those available under the trade names CYCLOTENE, HSQ or SU-8).

What is crucial, in an embodiment, is that sealing layer V causes the same phase shift of $\pi$ (or an odd multiple thereof) as spacer layer A. To this end, the product of layer thickness $d_A$, $d_V$ and refractive index $n_A$, $n_V$ of the respective layers A, V must be equal or differ by an odd multiple, because then light beam 4 has a phase offset of $2\pi$ (or another even multiple of $\pi$) relative to light beam 3 and interferes constructively with light beam 3. The slight reduction in brightness, as in the prior art, is eliminated and the bright/dark contrast is increased.

If spacer layer A and sealing layer V are formed from materials having the same refractive index; in particular from the same material, then the thicknesses $d_A$, $d_V$ of the two layers are preferably identical. However, again, odd multiples of one layer thickness relative to the other layer thickness are also possible as long as they cause an additional phase shift of $\pi$; i.e., to an overall phase shift of $2\pi$. In other words, layer thicknesses $d_A$, $d_V$ must be equal or differ by an odd factor.

Sealing layer V protects partially transparent layer M from environmental influences in the dark regions and may, for example, prevent oxidation of a thin chromium layer M, and thus possible deterioration of the bright/dark contrast of scale MV. In addition, sealing layer V protects the particularly thin partially transparent layer M from mechanical damage.

Due to sealing layer V, partially transparent layer M may be made overall slightly thicker, which contributes to increased process reliability. Looking at the dark region of scale MV in the left half of FIG. 2, it can be seen that upon exiting scale MV, light beams 2 and 5 have a phase difference of $2\pi$ and, therefore, interfere constructively. These light beams 2 and 5 must together interfere destructively with light beam 1, which therefore must have a higher intensity than in the prior art shown in FIG. 1. However, a higher intensity of light beam 1 means a stronger reflection at partially transparent layer M, and thus a greater layer thickness for this layer M. Theoretical calculations and experiments using light of the wavelength 455 nm, a spacer layer A and a sealing layer V, each made of $SiO_2$ (n=1.48) and having a thickness of approximately 65 nm), have revealed that the optimal thickness of a partially transparent chromium layer M is nearly 5 nm, while the optimum according to the prior art (i.e., without sealing layer V) is approximately 2.5 nm. Furthermore, according to calculations, the process window for the layer thickness of partially transparent layer M (i.e., the permitted variation in the thickness of layer M for a maximum reflection of 0.1 in the dark region) is enlarged by a factor of approximately two due to sealing layer V.

These calculations and experiments also revealed an increase in the bright/dark contrast (i.e., the reflection from the region without layer M minus the reflection from the region provided with layer M) from 0.7 to 0.8 when using the optimized sealing layer V.

The different layer thicknesses should be optimized as described for the wavelength of the light used for scanning scale MV. In this connection, it is found, for example, by calculations, that if the wavelength of the light deviates from the wavelength used for optimization, the wavelength ranges for which adequate contrasts are achievable are extended due to the sealing layer. Thus, the present invention also leads to scales which are capable of wider application and suitable for use with light of different wavelengths or with different scanning heads AK.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A scale for an optically scanning position-measuring device, the scale comprising:
   a carrier;
   a reflective layer disposed on the carrier;
   a transparent spacer layer disposed on the reflective layer, the spacer layer having a patterned, partially transparent layer thereon which defines a bright/dark pattern in which regions having the partially transparent layer appear dark and regions without the partially transparent layer appear bright; and
   a sealing layer disposed on the patterned, partially transparent layer,
   wherein products of refractive index and layer thickness are the same for the spacer layer and the sealing layer, or differ by an odd multiple.

2. The scale as recited in claim 1, wherein the spacer layer and the sealing layer have the same refractive index.

3. The scale as recited in claim 2, wherein the spacer layer and the sealing layer are made of the same material.

4. The scale as recited in claim 2, wherein the spacer layer and the sealing layer have the same thickness.

5. The scale as recited in claim 1, wherein the spacer layer and the sealing layer are made of silicon dioxide.

6. The scale as recited in claim 1, wherein the partially transparent layer is a chromium layer.

7. The scale as recited in claim 6, wherein the partially transparent layer is thinner than 10 nm.

8. A position measuring device, comprising:
   a scale comprising:
      a carrier,
      a reflective layer disposed on the carrier,
      a transparent spacer layer disposed on the reflective layer, the spacer layer having a patterned, partially transparent layer thereon which defines a bright/dark pattern in which regions having the partially transparent layer appear dark and regions without the partially transparent layer appear bright, and
      a sealing layer disposed on the patterned, partially transparent layer,
      wherein products of refractive index and layer thickness are the same for the spacer layer and the sealing layer, or differ by an odd multiple; and
   a scanning head configured to scan the scale using monochromatic light such that a light beam emitted by the scanning head and reflected at the reflective layer in one of the bright regions of the scale experiences a phase shift of $2\pi$ or an integer multiple thereof as the light beam passes twice through the spacer layer and the sealing layer, as compared to a light beam immediately reflected at an interface of the sealing layer.

9. The position-measuring device as recited in claim 8, wherein the thickness of the sealing layer is equal to, or is an odd multiple of, one-fourth of the wavelength of the light used by the scanning head divided by the refractive index of the sealing layer.

10. The position-measuring device as recited in claim 8, wherein the thickness of the spacer layer is equal to, or is an odd multiple of, one-fourth of the wavelength of the light used by the scanning head divided by the refractive index of the spacer layer.

* * * * *